(12) United States Patent
Chen et al.

(10) Patent No.: US 10,645,385 B2
(45) Date of Patent: May 5, 2020

(54) METHOD AND APPARATUS FOR PERFORMING FIXED-SIZE SLICE ENCODING WITH SLICE BOUNDARY PREDICTION

(71) Applicant: MEDIATEK INC., Hsin-Chu (TW)

(72) Inventors: Li-Heng Chen, Hsinchu (TW);
Lien-Fei Chen, Hsinchu (TW);
Tung-Hsing Wu, Hsinchu (TW);
Han-Liang Chou, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 114 days.

(21) Appl. No.: 16/004,419

(22) Filed: Jun. 10, 2018

(65) Prior Publication Data

US 2019/0007680 A1 Jan. 3, 2019

Related U.S. Application Data

(60) Provisional application No. 62/525,801, filed on Jun. 28, 2017.

(51) Int. Cl.
*H04N 19/119* (2014.01)
*H04N 19/174* (2014.01)
*H04N 19/159* (2014.01)
*H04N 19/436* (2014.01)
*H04N 19/147* (2014.01)
*H04N 19/91* (2014.01)
*H04N 19/184* (2014.01)
*H04N 19/15* (2014.01)
*H04N 19/46* (2014.01)

(52) U.S. Cl.
CPC ......... *H04N 19/119* (2014.11); *H04N 19/147* (2014.11); *H04N 19/15* (2014.11); *H04N 19/159* (2014.11); *H04N 19/174* (2014.11); *H04N 19/184* (2014.11); *H04N 19/436* (2014.11); *H04N 19/46* (2014.11); *H04N 19/91* (2014.11)

(58) Field of Classification Search
CPC ...... H04N 19/119; H04N 19/15; H04N 19/46; H04N 19/174; H04N 19/159; H04N 19/436; H04N 19/147; H04N 19/91; H04N 19/184; H04N 19/105; H04N 19/117; H04N 19/13
See application file for complete search history.

(56) References Cited

U.S. PATENT DOCUMENTS 9,210,424 B1  12/2015  Rintaluoma
2012/0230397 A1*  9/2012  Ouedraogo ............ H04N 19/70
375/240.03

* cited by examiner

*Primary Examiner* — James M Pontius
(74) *Attorney, Agent, or Firm* — Winston Hsu

(57) ABSTRACT

A video encoder includes a video encoding circuit and a slice decision circuit. The video encoding circuit encodes a first slice in a frame according to a first coding unit boundary between an end of the first slice and a start of a second slice in the frame, and outputs a first bitstream of the first slice. The slice decision circuit predicts the first coding unit boundary before a bitstream of a last coding unit of the first slice is generated by the video encoding circuit, and informs the video encoding circuit of the first coding unit boundary. The video encoding circuit refers to the first coding unit boundary predicted by the slice decision circuit to ensure that a bitstream size of the first bitstream is constrained by a predetermined bitstream size threshold.

12 Claims, 10 Drawing Sheets

METHOD AND APPARATUS FOR PERFORMING FIXED-SIZE SLICE ENCODING WITH SLICE BOUNDARY PREDICTION

CROSS REFERENCE TO RELATED APPLICATIONS

This application claims the benefit of U.S. provisional application No. 62/525,801, filed on Jun. 28, 2017 and incorporated herein by reference.

BACKGROUND

The present invention relates to encoding a video frame, and more particularly, to a method and an apparatus for performing fixed-size slice encoding with slice boundary prediction.

The conventional video coding standards generally adopt a block based (or coding unit based) coding technique to exploit spatial redundancy. For example, the basic approach is to divide the whole source frame into a plurality of blocks (coding units), perform prediction on each block (coding unit), transform residues of each block (coding unit), and perform quantization and entropy encoding. Besides, a reconstructed frame is generated in a coding loop to provide reference pixel data used for coding following blocks (coding units). For certain video coding standards, in-loop filter(s) may be used for enhancing the image quality of the reconstructed frame.

Separating a video frame into multiple slices is essential in some applications, such as error resilience, network transmission, low-latency codec design, etc. Specifically, the slices may be independently encoded at an encoder side, and thus may be independently decodable at a decoder side. For certain applications such as video conference call (e.g., ViLTE (Video over LTE) and video streaming service (e.g., VOD (Video on Demand) or uni-cast/multi-cast IPTV (Internet Protocol Television)), fixed-size slice encoding is mostly used to make bitstream sizes of slices constrained by a maximum encoded slice size. That is, $$\sum_{i \in slice} MBSize_i < SliceSize_{Max},$$

where i is the index of each coding unit in a frame, $MBSize$ is the bitstream size of each coding unit, and $SliceSize_{Max}$ is the maximum bitstream size of a slice. However, when a video encoder encodes a current coding unit, bit-count information of the current coding unit is not available because of the hardware limitation of pipeline architecture employed by the video encoder. Hence, it is possible that the encoded slice size exceeds the maximum encoded slice size after encoding the current coding unit that is the last coding unit of the current slice. If the encoded slice size exceeds the maximum encoded slice size, re-encoding the last coding unit to make the encoded slice size constrained by the maximum encoded slice size is not feasible in the hardware implementation.

SUMMARY

One of the objectives of the claimed invention is to provide a method and an apparatus for performing fixed-size slice encoding with slice boundary prediction.

According to a first aspect of the present invention, an exemplary video encoder is disclosed. The exemplary video encoder includes a video encoding circuit and a slice decision circuit. The video encoding circuit is arranged to encode a first slice in a frame according to a first coding unit boundary between an end of the first slice and a start of a second slice in the frame, and output a first bitstream of the first slice, wherein each slice in the frame comprises a plurality of coding units, and each coding unit comprises a plurality of pixels. The slice decision circuit is arranged to predict the first coding unit boundary before a bitstream of a last coding unit of the first slice is generated by the video encoding circuit, and inform the video encoding circuit of the first coding unit boundary, wherein the video encoding circuit refers to the first coding unit boundary predicted by the slice decision circuit to ensure that a bitstream size of the first bitstream is constrained by a predetermined bitstream size threshold.

According to a second aspect of the present invention, an exemplary video encoding method is disclosed. The exemplary video encoding method includes: encoding, by a video encoding circuit, a first slice in a frame according to a first coding unit boundary between an end of the first slice and a start of a second slice in the frame, and outputting a first bitstream of the first slice, wherein each slice in the frame comprises a plurality of coding units, and each coding unit comprises a plurality of pixels; and predicting the first coding unit boundary before a bitstream of a last coding unit of the first slice is generated by the video encoding circuit, and informing the video encoding circuit of the first coding unit boundary, wherein the video encoding circuit refers to the predicted first coding unit boundary to ensure that a bitstream size of the first bitstream is constrained by a predetermined bitstream size threshold.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
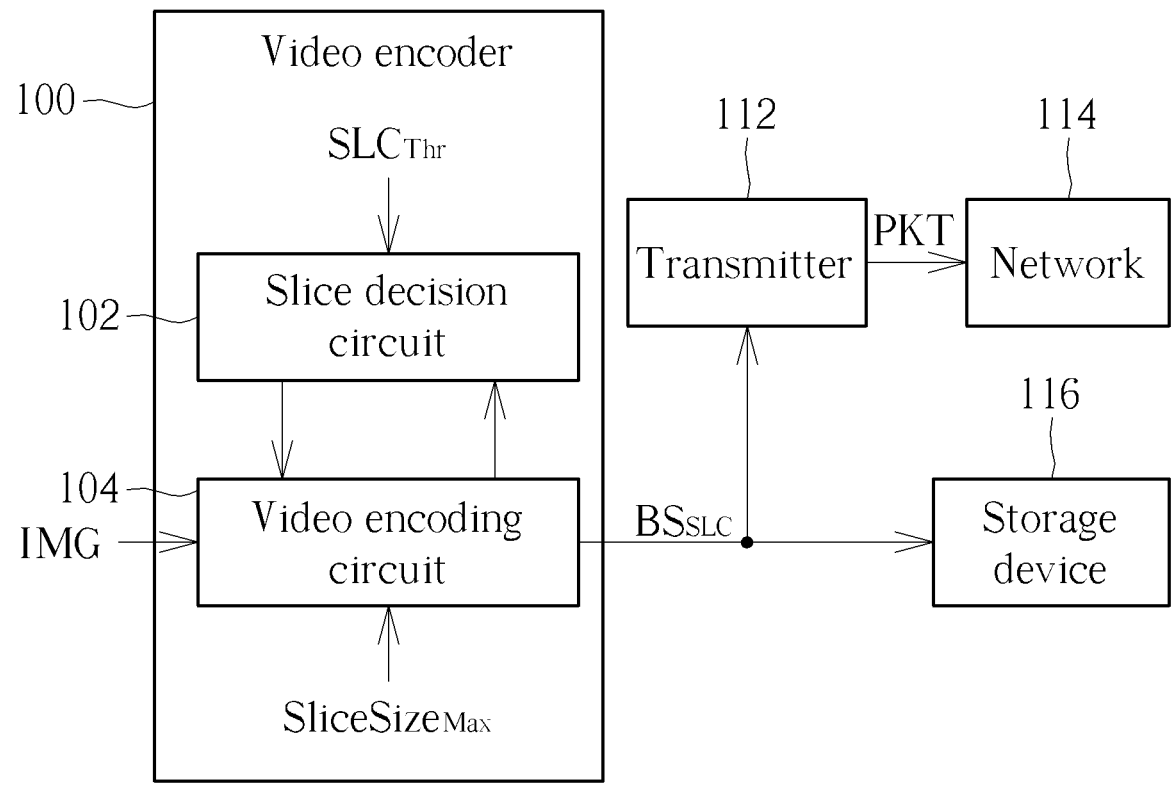
FIG. 1 is a diagram illustrating a video encoder according to an embodiment of the present invention.
Figure 2:
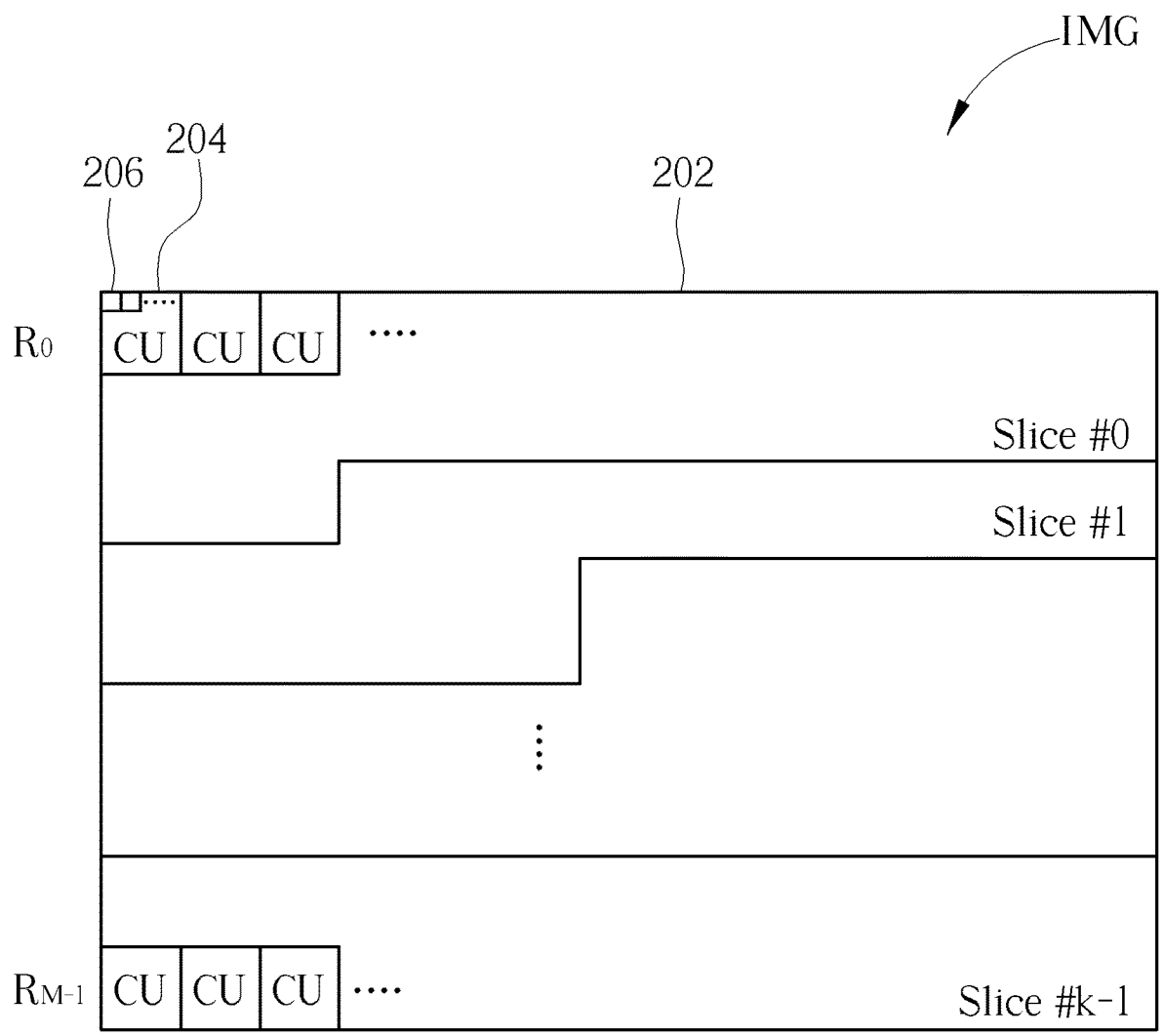
FIG. 2 is a diagram illustrating a video frame divided into a plurality of slices according to an embodiment of the present invention.

FIG. 1 is a diagram illustrating a video encoder according to an embodiment of the present invention. The video encoder 100 includes a slice decision circuit 102 and a video encoding circuit 104. The video encoder 100 divides one video frame IMG into a plurality of slices. For example, the video encoder 100 may encode the slices in the same video frame IMG independently. Hence, encoded data of each slice may be independently decodable at a video decoder (not shown). However, this is for illustrative purposes only, and is not meant to be a limitation of the present invention. FIG. 2 is a diagram illustrating a video frame divided into a plurality of slices according to an embodiment of the present invention. The video frame IMG includes a plurality of coding unit rows $R_0$-$R_{M-1}$. Each of the coding unit rows $R_0$-$R_{M-1}$ includes a plurality of coding units (CUs) 204. Each of the coding units 204 includes a plurality of pixels 206. For example, the coding units 204 may be macroblocks (MBs), superblocks (SBs), code tree blocks (CTBs), or macroblock pairs, depending upon the actual coding standard. In this example, the video frame IMG is divided into multiple slices (e.g., Slice #0, Slice #1, . . . , Slice # k−1), where the slices are encoded by the video encoding circuit 104. After a slice is encoded, a bitstream $BS_{SLC}$ of the slice is output from the video encoding circuit 104. For some applications, the bitstream B of one slice may be stored into a storage device 116. For other applications, the bitstream $BS_{SLC}$ of one slice is forwarded to a transmitter 112. The transmitter 112 packs the bitstream $BS_{SLC}$ of one slice into network packets PKT, and sends the network packets PKT to one or more destination devices via a network 114. For example, the network packets PKT may be real-time transport protocol (RTP) packets.

Figure 3:
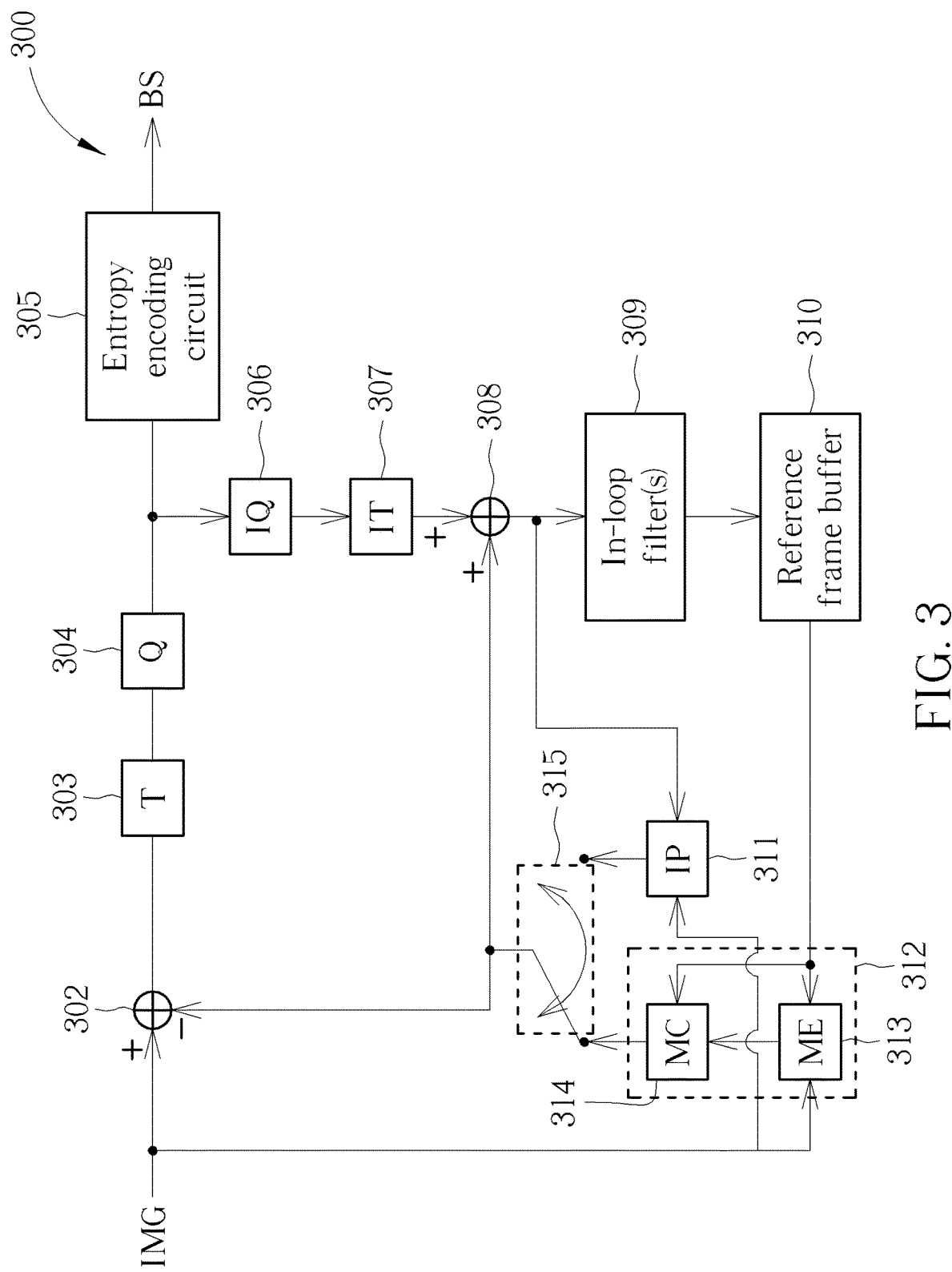
FIG. 3 is a diagram illustrating a video encoding circuit according to an embodiment of the present invention.

The video encoding circuit 104 is a core part of the video encoder 100, and has encoder architecture complying with the coding standard. FIG. 3 is a diagram illustrating a video encoding circuit according to an embodiment of the present invention. The video encoding circuit 104 shown in FIG. 1 may be implemented using the video encoding circuit 300 shown in FIG. 3. It should be noted that the encoder architecture shown in FIG. 3 is for illustrative purposes only, and is not meant to be a limitation of the present invention. For example, different encoder architecture may be used under different coding standards, respectively. In this embodiment, the video encoding circuit 300 includes a residual calculation circuit 302, a transform circuit (denoted by "T") 303, a quantization circuit (denoted by "Q") 304, an entropy encoding circuit (e.g., a variable length encoder) 305, an inverse quantization circuit (denoted by "IQ") 306, an inverse transform circuit (denoted by "IT") 307, a reconstruction circuit 308, at least one in-loop filter 309, a reference frame buffer 310, an intra prediction circuit (denoted by "IP") 311, an inter prediction circuit 312 (which includes a motion estimation circuit (denoted by "ME") 313 and a motion compensation circuit (denoted by "MC") 314), and a mode decision circuit 315. Since basic functions and operations of these circuit blocks implemented in the video encoding circuit 300 are well known to those skilled in the pertinent art, further description is omitted here for brevity.

In this embodiment, the slice decision circuit 102 is arranged to predict a coding unit boundary (e.g., an MB/SB/CTB/MB pair boundary) between a current slice and a next slice before a bitstream of a last coding unit (e.g., a last MB/SB/CTB/MB pair) of the current slice is generated by the video encoding circuit 104. The slice decision circuit 102 is further arranged to inform the video encoding circuit 104 of the predicted coding unit boundary, such that the video encoding circuit 104 can refer to the coding unit boundary predicted by the slice decision circuit 102 to ensure that a bitstream size of the bitstream of the current slice is constrained by a predetermined bitstream size threshold $SliceSize_{Max}$. In a case where fixed-size slice encoding is employed by the video encoding circuit 104, the predetermined bitstream size threshold $SliceSize_{Max}$ may be a fixed value that is the maximum bitstream size of each slice encoded by the video encoding circuit 104. Alternatively, the predetermined bitstream size threshold $SliceSize_{Max}$ may be adaptively adjusted. For example, the predetermined bitstream size threshold $SliceSize_{Max}$ may be set by a first value that acts as the maximum bitstream size of a first slice encoded by the video encoding circuit 104, and the predetermined bitstream size threshold $SliceSize_{Max}$ may be set by a second value that acts as the maximum bitstream size of a second slice encoded by the video encoding circuit 104, where the first value and the second value are not necessarily the same.

More specifically, the video encoding circuit 104 encodes the current slice in the video frame IMG according to the coding unit boundary between an end of the current slice (e.g., the last coding unit of the current slice) and a start of a next slice (e.g., the first coding unit of the next slice) in the same video frame IMG, and outputs the bitstream of the current slice (i.e., an encoded result of the current slice). In this embodiment, the slice decision circuit 102 determines if a current coding unit is the last coding unit of the current slice before a bitstream (i.e., an encoded result) of the current coding unit is generated by the video encoding circuit 104. When the coding unit boundary is predicted before encoding of the current slice is completed, a position of the first coding unit in the next slice and a position of the last coding unit in the current slice can be determined in advance. When the current coding unit is judged as the last coding unit of the current slice (or the next coding unit is judged as the first coding unit of the next slice), the video encoding circuit 104 can properly control the encoded size of the current coding unit to make the bitstream size of the bitstream of the current slice (i.e., an encoded size of the current slice) constrained by the predetermined bitstream size threshold $SliceSize_{Max}$ $$\left( e.g., \sum_{i \in slice} MBSize_i < SliceSize_{Max} \right).$$

Since the condition in which the encoded slice size exceeds the maximum encoded slice size after encoding the current coding unit that is the last coding unit of the current slice can be avoided by slice boundary prediction (i.e., slice end prediction/slice start prediction) made by the slice decision circuit 102, none of coding units in the current slice is needed to be re-encoded by the video encoding circuit 104 for making the bitstream size of the bitstream of the current slice constrained by the predetermined bitstream size threshold $SliceSize_{Max}$. In this way, hardware implementation of fixed-size slice encoding can be successfully realized in the video encoder 100. Further details of the proposed slice boundary prediction (i.e., slice end prediction/slice start prediction) are described as below.

Figure 4:
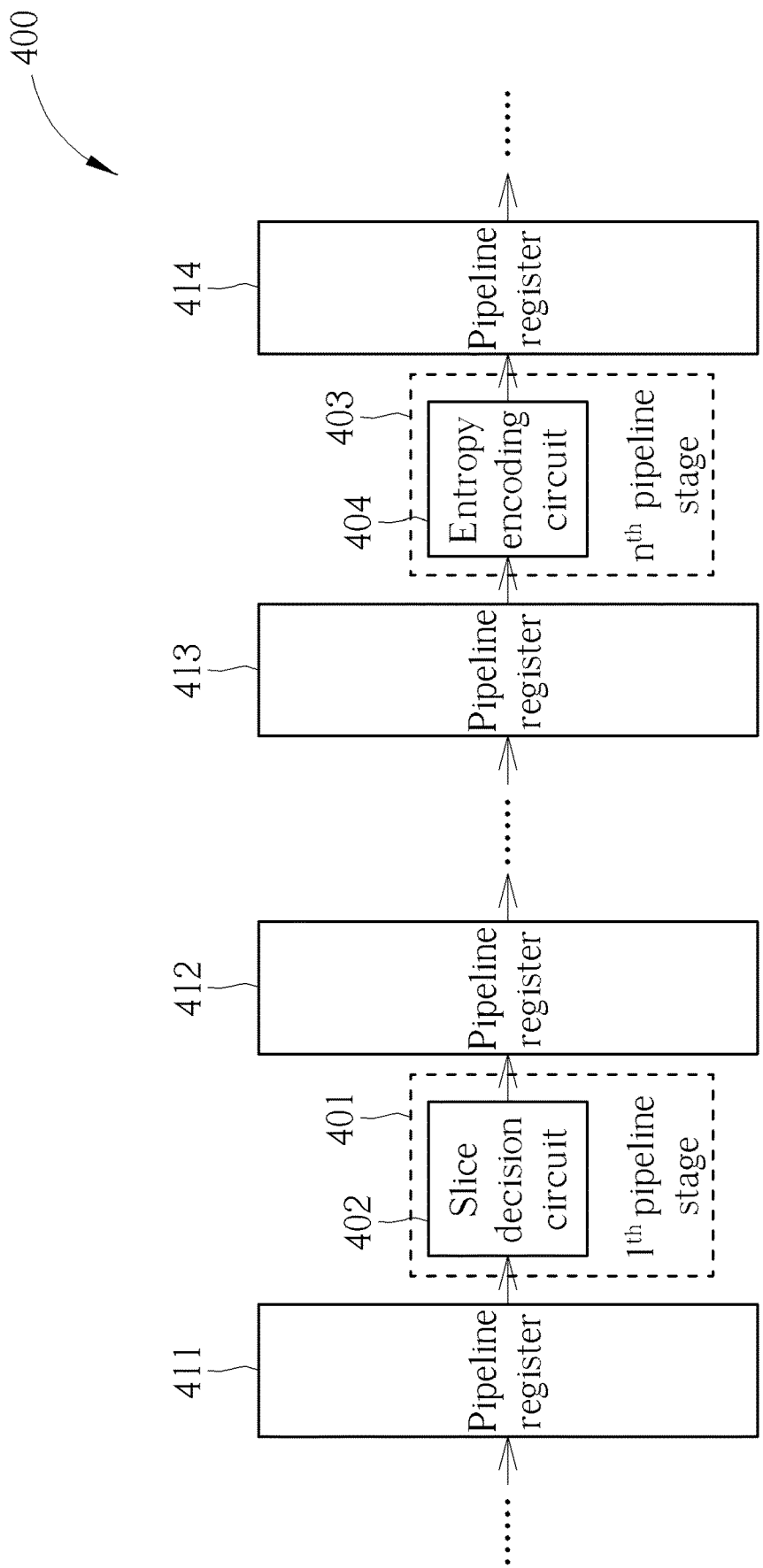
FIG. 4 is a diagram illustrating a first pipeline-based video encoder according to an embodiment of the present invention.

FIG. 4 is a diagram illustrating a first pipeline-based video encoder according to an embodiment of the present invention. The video encoder 100 shown in FIG. 1 may be implemented using the pipeline-based video encoder 400 shown in FIG. 4. In this embodiment, the pipeline-based video encoder 400 has a slice decision circuit 402 and a video encoding circuit (which includes an entropy encoding circuit 404 and other circuit blocks (not shown) needed by the designated video encoding function) are configured in multi-stage pipeline architecture with a plurality of cascaded pipeline stages. The slice decision circuit 402 of the pipeline-based video encoder 400 may act as the slice decision circuit 102 shown in FIG. 1. In addition, the video encoding circuit of the pipeline-based video encoder 400 may act as the video encoding circuit 104 shown in FIG. 1.

As shown in FIG. 4, the slice decision circuit 402 is located at the $l^{th}$ pipeline stage 401, and the entropy encoding circuit 404 is located at the $n^{th}$ pipeline stage 403, where l<n. It should be noted that the video encoding circuit may have circuit blocks (not shown) other than the entropy encoding circuit 404, and these circuit blocks may be located at certain pipeline stages (not shown) of the multi-stage pipeline architecture. Further, a pipeline register 411 is coupled between the $l^{th}$ pipeline stage 401 and a previous pipeline stage (i.e., $(l-1)^{th}$ pipeline stage), and a pipeline register 412 is coupled between the $l^{th}$ pipeline stage 401 and a next pipeline stage (i.e., $(l+1)^{th}$ pipeline stage). Similarly, a pipeline register 413 is coupled between the $n^{th}$ pipeline stage 403 and a previous pipeline stage (i.e., $(n-1)^{th}$ pipeline stage), and a pipeline register 414 is coupled between the $n^{th}$ pipeline stage 403 and a next pipeline stage (i.e., $(n+1)^{th}$ pipeline stage).

Coding units of the video frame IMG may be processed in a pipeline fashion. That is, one coding unit is sequentially processed by different pipeline stages, and the different pipeline stages deal with different coding units at the same time. Further, coding units of a video frame may be encoded in a raster scan order. The coding units in the same video frame are fed into the multi-stage pipeline architecture in a raster scan order. That is, coding units in the same coding unit row are processed from the left-most coding unit to the right-most coding unit, and coding unit rows in the same video frame are processed from the uppermost coding row to the lowermost coding row. Hence, coding units $CU_i$ belonging to the same slice are sequentially fed into the multi-stage pipeline architecture, where i is the coding unit index in a slice, and the slice starts with $CU_0$ (i.e., $CU_i$ with i=0).

Figure 5:
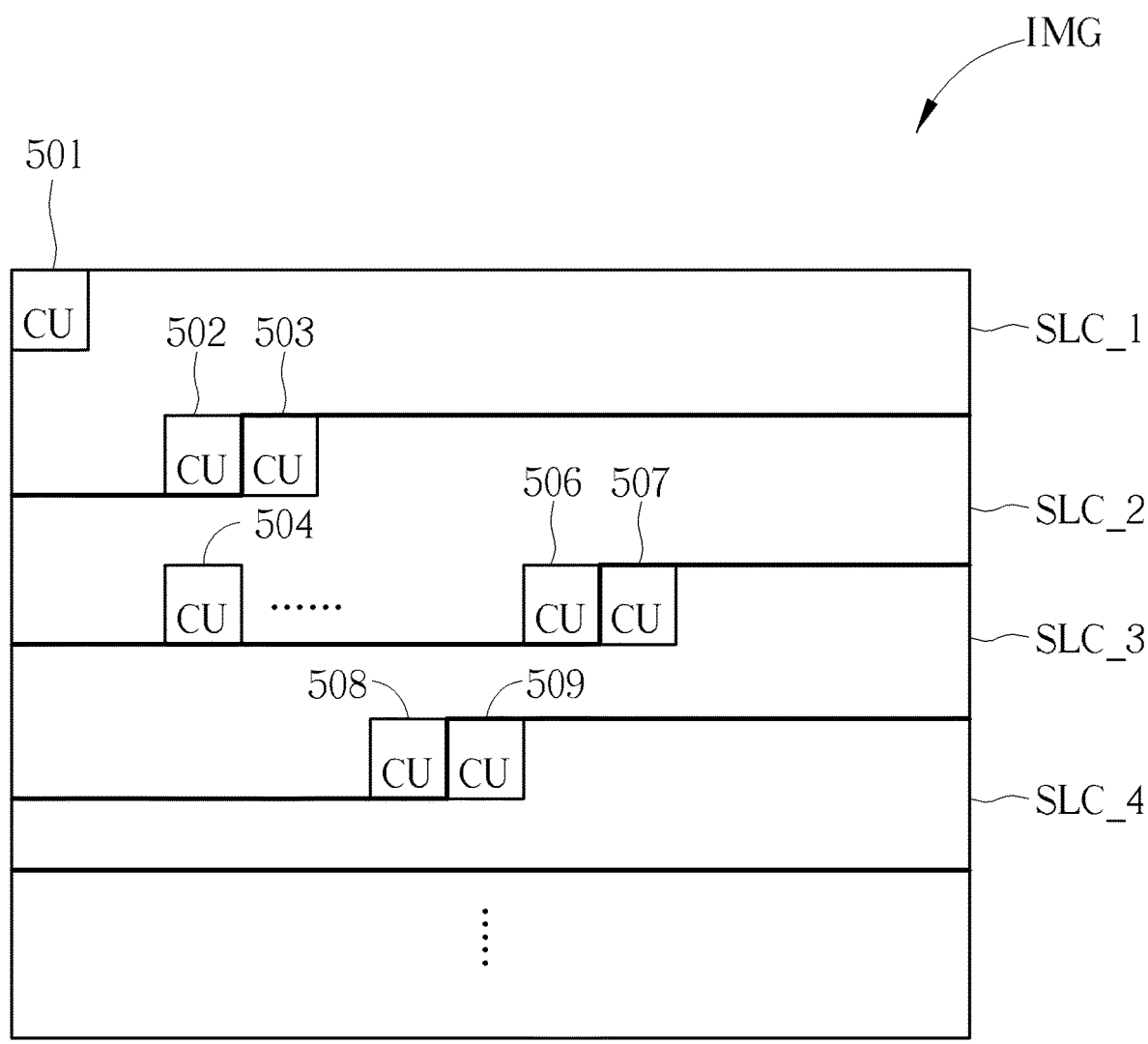
FIG. 5 is a diagram illustrating an arrangement of coding units belonging to different slices encoded using a fixed-size slice encoding scheme according to an embodiment of the present invention.

Please refer to FIG. 4 in conjunction with FIG. 5. FIG. 5 is a diagram illustrating an arrangement of coding units belonging to different slices encoded using a fixed-size slice encoding scheme according to an embodiment of the present invention. Since bitstream sizes of bitstreams of different slices in the same video frame IMG (i.e., encoded sizes of different slices in the same video frame IMG) are required to be constrained by respective predetermined bitstream size thresholds (i.e., maximum encoded slice sizes) $SliceSize_{Max}$ that may be identical to or different from each other, the coding unit boundary between adjacent slices (e.g., boundary between an end of a current slice and a start of a next slice) should be determined by the slice decision circuit 402 beforehand to avoid the condition in which the encoded slice size exceeds the maximum encoded slice size after encoding the current coding unit that is the last coding unit of the current slice.

As shown in FIG. 5, the slice decision circuit 402 is operative to determine that the coding unit 502 is the last coding unit of the slice SLC_1, the coding unit 506 is the last coding unit of the slice SLC_2, and the coding unit 508 is the last coding unit of the slice SLC_3. Since the coding unit 502 is the last coding unit of the slice SLC_1, the next coding unit (i.e., coding unit 503) is identified as the first coding unit of the next slice (i.e., $CU_0$ of slice SLC_2). Since the coding unit 506 is the last coding unit of the slice SLC_2, the next coding unit (i.e., coding unit 507) is identified as the first coding unit of the next slice (i.e., $CU_0$ of slice SLC_3). Since the coding unit 508 is the last coding unit of the slice SLC_3, the next coding unit (i.e., coding unit 509) is identified as the first coding unit of the next slice (i.e., $CU_0$ of slice SLC_4).

The slice SLC_1 starts with the coding unit 501 and ends with the coding unit 502. The slice SLC_2 starts with the coding unit 503 and ends with the coding unit 506. The slice SLC_3 starts with the coding unit 507 and ends with the coding unit 508. It should be noted that different slices (e.g., SLC_1-SLC_4) in the same video frame may have different numbers of coding units (i.e., different unencoded slice sizes), but would have the same bitstream size (i.e., the same encoded slice size) under fixed-size slice encoding, if the same predetermined bitstream size threshold $SliceSize_{Max}$ is employed by encoding of different slices.

As mentioned above, coding units in the same video frame are fed into the multi-stage pipeline architecture in a raster scan order. When a current coding unit enters the $l^{th}$ pipeline stage 401 at which the slice decision circuit 402 is located, the slice decision circuit 402 is operative to determine if the current coding unit is the last coding unit of a current slice. Suppose that the coding unit boundary between an end of the slice SLC_1 and a start of the slice SLC_2 has been identified by the slice decision circuit 402, the coding unit 506 is the $N^{th}$ coding unit $CU_N$ (i.e., $CU_i$ with i=N) in the slice SLC_2, and the coding unit 504 is the $(N+l-n)^{th}$ coding unit $CU_{N+l-n}$ (i.e., $CU_i$ with i=N+l-n) in the slice SLC_2. When the coding unit 506 is a current coding unit that enters the $l^{th}$ pipeline stage 401, a previous coding unit that has been processed by the $l^{th}$ pipeline stage 401 and now enters the $n^{th}$ pipeline stage 403 (n>l) is the coding unit 504. Due to inherent characteristics of the multi-stage pipeline architecture, all of the coding units $CU_i$ with 0≤i≤N+l-n have been processed by the entropy encoding circuit 404 sequentially. After a bitstream of the coding unit 504 (i.e., $CU_{N+l-n}$ in the slice SLC_2) is generated by the entropy encoding circuit 404, actual bit counts of bitstreams of all of the coding units $CU_i$ with 0≤i≤N+l-n determined by the entropy encoding circuit 404 are available to the slice decision circuit 402. The slice decision circuit 402 can fetch and store an actual bit count of the bitstream of a coding unit each time the bitstream of the coding unit is generated by the entropy encoding circuit 404.

At this moment, all of the coding units $CU_i$ with N+1−n+1≤i≤N are not yet being processed by the entropy encoding circuit 404 due to the inherent characteristics of the multi-stage pipeline architecture. Hence, actual bit counts of bitstreams of all of the coding units $CU_i$ with N+1−n+1≤i≤N are not available to the slice decision circuit 402. The present invention proposes using a parameter $CUBit_{emp}$ in slice boundary prediction (i.e., slice end prediction/slice start prediction) performed at the slice decision circuit 402, where the parameter $CUBit_{emp}$ is representative of a predicted bit count of all coding units $CU_i$ (N+1−n+1≤i≤N) in the pipeline that do not undergo entropy encoding involved in encoding of the coding units $CU_i$ (N+1−n+1≤i≤N) yet.

In a first exemplary parameter setting design, the parameter $CUBit_{emp}$ used by the slice decision circuit 402 may be derived from a preset empirical constant value.

In a second exemplary parameter setting design, the parameter $CUBit_{emp}$ used by the slice decision circuit 402 may be derived from information fetched from the video encoder. For example, the information fetched from the video encoder may include actual bit counts of bitstreams of previous processed coding units that are determined by the entropy encoding circuit 404. Hence, the parameter $CUBit_{emp}$ may be set on the basis of a maximum bit count or an average bit count that is derived from the information fetched from the video encoder.

In a third exemplary parameter setting design, the parameter $CUBit_{emp}$ used by the slice decision circuit 402 may be derived from the setting of the video encoder. For example, the quantization circuit 304 shown in FIG. 3 performs quantization upon transform coefficients according to a quantization parameter (QP) setting, and the inverse quantization circuit 306 performs inverse quantization upon the quantized transform coefficients according to the same QP setting used by the quantization circuit 304. When the video encoding circuit of the pipeline-based video encoder 400 is implemented using the video encoding circuit 300, the setting of the video encoder may include the QP setting. Hence, the setting of the parameter $CUBit_{emp}$ depends on the QP setting.

In a fourth exemplary parameter setting design, the parameter $CUBit_{emp}$ used by the slice decision circuit 402 may be derived from the setting of the slice decision circuit 402. For example, a threshold value $SLC_{Thr}$ is used by the slice decision circuit 402 to judge if the current coding unit is the last coding unit of the current slice. Hence, the setting of the parameter $CUBit_{emp}$ depends on the threshold value $SLC_{Thr}$.

In a fifth exemplary parameter setting design, the parameter $CUBit_{emp}$ used by the slice decision circuit 402 may be derived from a capacity of a network (e.g., network 114 shown in FIG. 1) through which bitstreams generated by the entropy encoding circuit 404 are transmitted.

Figure 10:
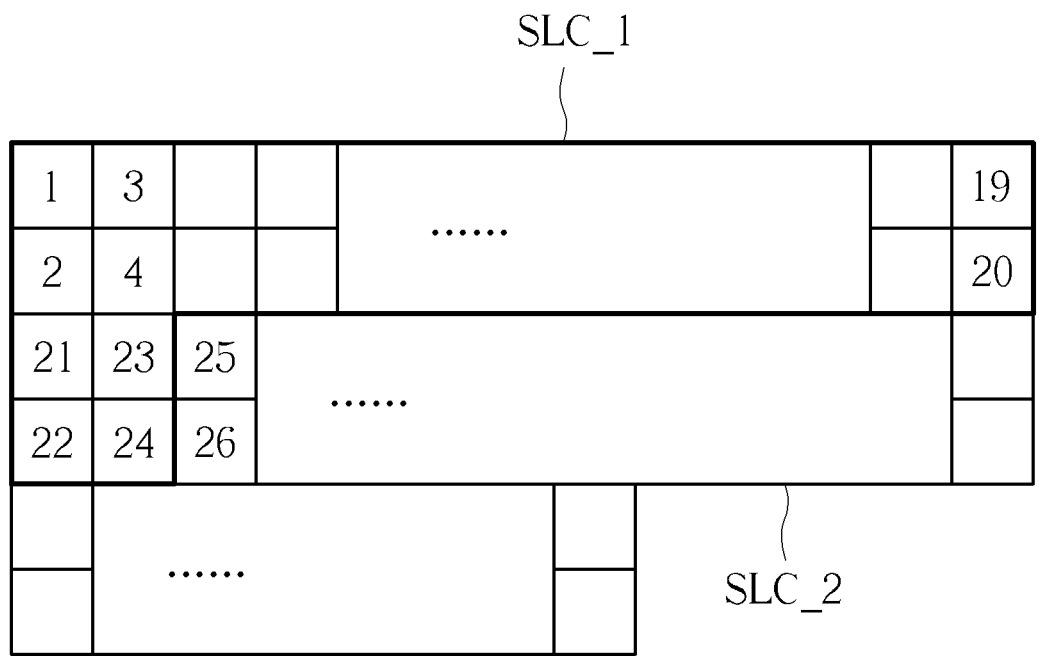
FIG. 10 is a diagram illustrating a slice boundary that is a macroblock pair boundary predicted under a macroblock-adaptive frame-field coding mode according to an embodiment of the present invention.

In a sixth exemplary parameter setting design, the parameter $CUBit_{emp}$ used by the slice decision circuit 402 may be derived from availability of macroblock-adaptive frame-field (MBAFF) coding. The MBAFF coding makes it possible to adaptively switch between frame and field coding within a single frame, for example, to maximize the coding efficiency. Since macroblocks are handled in pairs consisting of two vertically adjacent macroblocks under MBAFF coding, a coding unit boundary between an end of a current slice and a start of a next slice should be a boundary between two macroblock pairs each consisting of two vertically adjacent macroblocks. Hence, the parameter $CUBit_{emp}$ should be properly set to ensure correctness of the slice boundary prediction (i.e., slice end prediction/slice start prediction) under fixed-length slice encoding. FIG. 10 is a diagram illustrating a slice boundary that is a macroblock pair boundary predicted under an MBAFF coding mode according to an embodiment of the present invention. An encoding order of macroblocks under the MBAFF coding mode is illustrated by sequential index values "1", "2", "3", "4", ... "19", "20", "21", "22", "23", "24", "25", and "26". As shown in FIG. 10, macroblocks with index values "1" and "2" form one macroblock pair, macroblocks with index values "3" and "4" form one macroblock pair, macroblocks with index values "19" and "20" form one macroblock pair, macroblocks with index values "21" and "22" form one macroblock pair, macroblocks with index values "23" and "24" form one macroblock pair, and macroblocks with index values "25" and "26" form one macroblock pair. Since each macroblock pair consists of two vertically adjacent macroblocks, the last macroblock of one slice SLC_1 (i.e., the macroblock with the index value "24") and the first macroblock of the next slice SLC_2 (i.e., the macroblock with the index value "25") are not vertically adjacent to each other.

It should be noted that the above parameter setting designs are for illustrative purposes only, and are not meant to be limitations of the present invention. In practice, setting of the parameter $CUBit_{emp}$ used by the slice decision circuit 402 may vary, depending upon actual design considerations.

When the coding unit 506 (i.e., $CU_N$ in the slice SLC_2) is a current coding unit that enters the $1^{th}$ pipeline stage 401 at which the slice decision circuit 402 is located, the slice decision circuit 402 calculates a bit-sum $BitSum_N$ of a slice to determine if the coding unit 506 (i.e., $CU_N$ in the slice SLC_2) is the last coding unit of the slice SLC_2 under fixed-size slice encoding. For example, the computation of the bit-sum $BitSum_N$ may be expressed using the following formula.

$$BitSum_N = \sum_{i=0}^{i=N+1-n} CUBit_i + SLC_{hdr} + CUBit_{emp} \quad (1)$$

In above formula (1), i is the coding unit index in a slice, $CUBit_i$ is an actual bit count of a bitstream of a coding unit $CU_i$ determined by the entropy encoding circuit 404, $SLC_{hdr}$ is a predetermined bit count of a slice header, and $CUBit_{emp}$ is a parameter representative of a predicted bit count of at least one coding unit in the pipeline that does not undergo entropy encoding yet.

After the estimated bit-sum $BitSum_N$ of the slice SLC_2 is obtained using above formula (1), the slice decision circuit 402 compares the estimated bit-sum $BitSum_N$ with the threshold value $SLC_{Thr}$ to generate a comparison result, and refers to the comparison result to determine if the coding unit 506 (i.e., $CU_N$ in the slice SLC_2) is the last coding unit of the slice SLC_2 under fixed-size slice encoding. If the estimated bit-sum $BitSum_N$ exceeds the threshold value $SLC_{Thr}$, the slice decision circuit 402 determines that the coding unit 506 (i.e., $CU_N$ in the slice SLC_2) is the last coding unit of the slice SLC_2 under fixed-size slice encoding, and indicates end-of-slice to the video encoding circuit. In some embodiments of the present invention, an end-of-slice syntax is signaled in the bitstream of the slice SLC_2 generated from the entropy encoding circuit 404. If the estimated bit-sum $BitSum_N$ does not exceed the threshold value $SLC_{Thr}$ yet, the slice decision circuit 402 determines that the coding unit 506 (i.e., $CU_N$ in the slice SLC_2) is not the last coding unit of the slice SLC_2 under fixed-size slice encoding.

It should be noted that the setting of the threshold value $SLC_{Thr}$ may be adjusted, depending on the setting of the parameter $CUBit_{emp}$ which is a predicted bit count of coding unit(s) in the pipeline. For example, the threshold value $SLC_{Thr}$ may be smaller than or equal to the predetermined bitstream size threshold $SliceSize_{Max}$. Further, the same formula (1) can be used to identify last coding units of other slices (e.g., coding unit 502 of slice SLC_1 and coding unit 508 of slice SLC_3) under fixed-size slice encoding.

Figure 6:
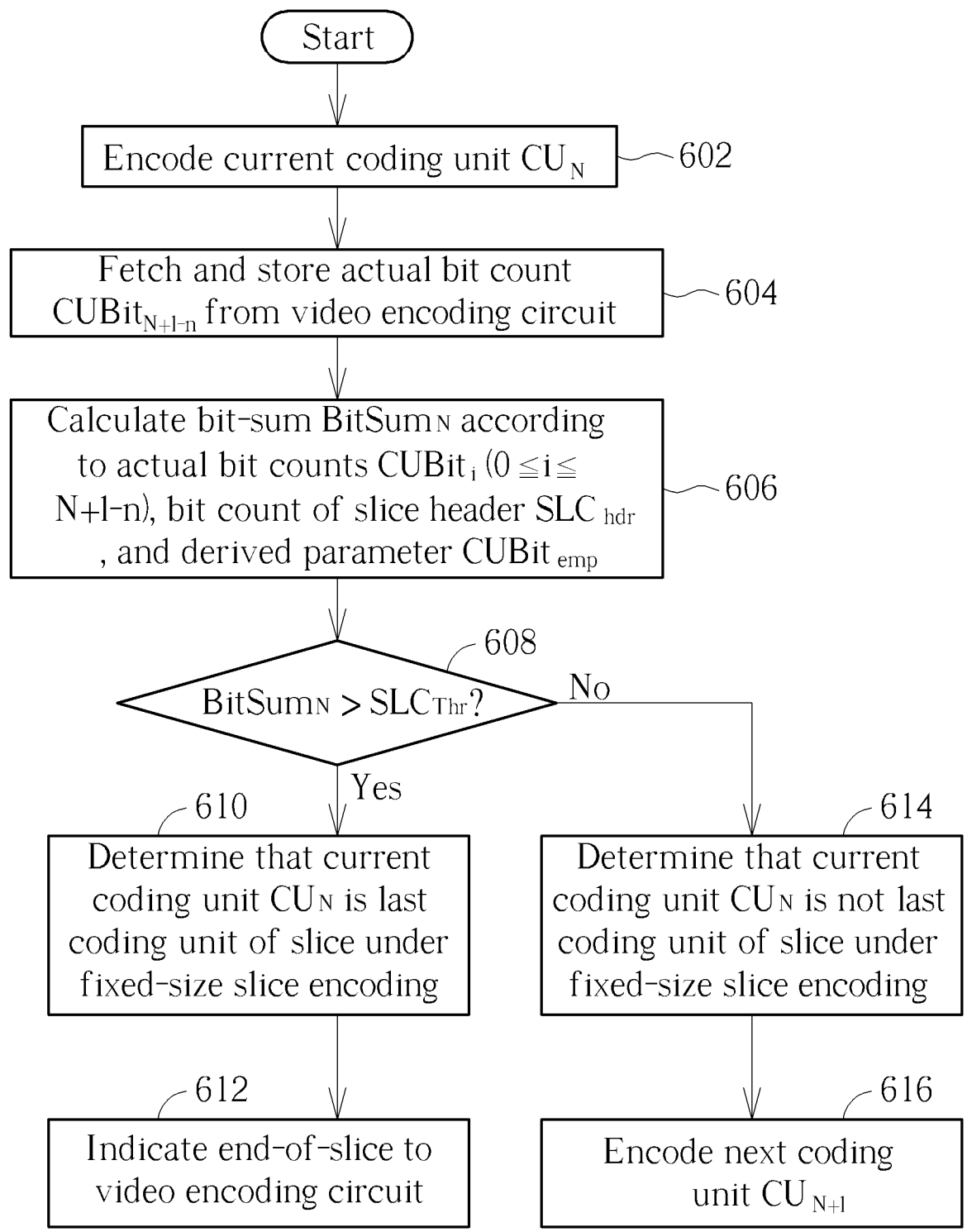
FIG. 6 is a flowchart illustrating a first slice boundary prediction method for determining a start/end of a slice processed under fixed-size slice encoding according to an embodiment of the present invention.

FIG. 6 is a flowchart illustrating a first slice boundary prediction method for determining a start/end of a slice processed under fixed-size slice encoding according to an embodiment of the present invention. Provided that the result is substantially the same, the steps are not required to be executed in the exact order shown in FIG. 6. The slice boundary prediction method may include following steps.

Step 602: The $l^{th}$ pipeline stage 401 performs processing of the current coding unit $CU_N$ in a current slice, wherein the slice decision circuit 402 is located at the $l^{th}$ pipeline stage 401.

Step 604: The slice decision circuit 402 fetches and stores an actual bit count $CUBit_{N+l-n}$ of a bitstream of the coding unit $CU_{N+l-n}$ from the video encoding circuit (particularly, the $n^{th}$ pipeline stage 403 at which the entropy encoding circuit 404 is located).

Step 606: The slice decision circuit 402 calculates a bit-sum $BitSum_N$ of the current slice according to actual bit counts $CUBit_i$ ($0 \leq i \leq N+l-n$), a bit count of a slice header $SLC_{hdr}$, and a derived parameter $CUBit_{emp}$.

Step 608: The slice decision circuit 402 checks if the estimated bit-sum $BitSum_N$ exceeds the threshold value $SLC_{Thr}$.

Step 610: The slice decision circuit 402 predicts a coding unit boundary between the current slice and a next slice by determining that the current coding unit $CU_N$ is the last coding unit of the current slice under fixed-size slice encoding.

Step 612: The slice decision circuit 402 indicates end-of-slice to the video encoding circuit.

Step 614: The slice decision circuit 402 determines that the current coding unit $CU_N$ is not the last coding unit of the current slice under fixed-size slice encoding.

Step 616: The $l^{th}$ pipeline stage 401 proceeds with processing of the next coding unit $CU_{N+l}$ in the current slice.

Since a person skilled in the pertinent art can readily understand details of the slice boundary prediction method shown in FIG. 6 after reading above paragraphs directed to the pipeline-based video encoder 400 shown in FIG. 4, further description is omitted here for brevity.

In above slice boundary prediction design, when the current coding unit $CU_N$ enters the $l^{th}$ pipeline stage 401 at which the slice decision circuit 402 is located, the parameter $CUBit_{emp}$ used by the slice decision circuit 402 is set to represent a predicted bit count of all coding units $CU_i$ ($N+l-n+1 \leq i \leq N$) in the pipeline that do not undergo entropy encoding involved in encoding of the coding units $CU_i$ ($N+l-n+1 \leq i \leq N$) yet. Alternatively, auxiliary bit information provided by intermediate pipeline stage(s) between the $l^{th}$ pipeline stage and the $n^{th}$ pipeline stage may also be used by the slice boundary prediction.

Figure 7:
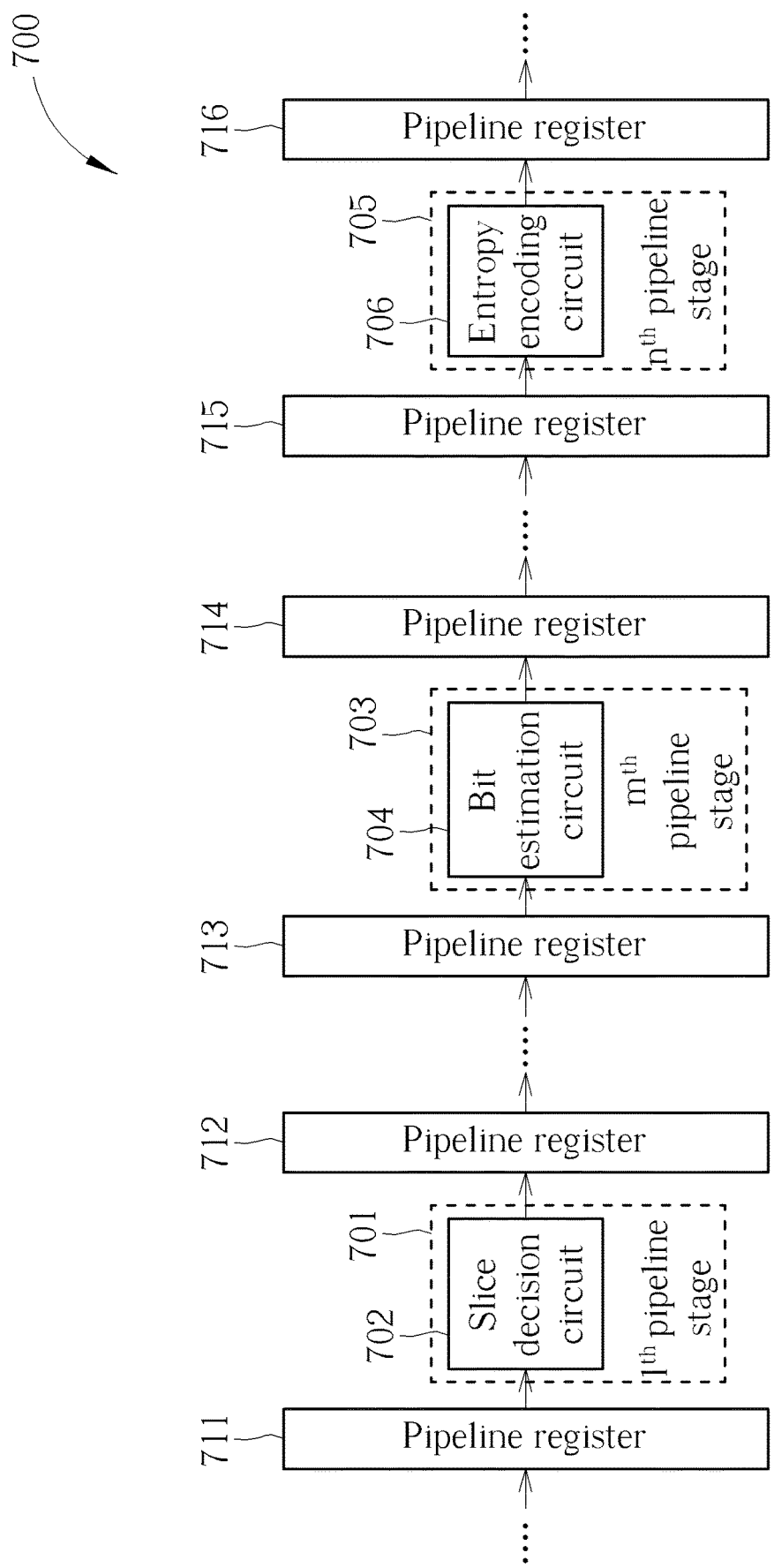
FIG. 7 is a diagram illustrating a second pipeline-based video encoder according to an embodiment of the present invention.

FIG. 7 is a diagram illustrating a second pipeline-based video encoder according to an embodiment of the present invention. The video encoder 100 shown in FIG. 1 may be implemented using the pipeline-based video encoder 700 shown in FIG. 7. In this embodiment, the pipeline-based video encoder 700 has a slice decision circuit 702 and a video encoding circuit (which includes a bit estimation circuit 704, an entropy encoding circuit 706, and other circuit blocks (not shown) needed by the designated video encoding function) are configured in multi-stage pipeline architecture with a plurality of cascaded pipeline stages. The slice decision circuit 702 of the pipeline-based video encoder 700 may act as the slice decision circuit 102 shown in FIG. 1. In addition, the video encoding circuit of the pipeline-based video encoder 700 may act as the video encoding circuit 104 shown in FIG. 1.

As shown in FIG. 7, the slice decision circuit 702 is located at the $l^{th}$ pipeline stage 701, the bit estimation circuit 704 is located at the $m^{th}$ pipeline stage 703, and the entropy encoding circuit 706 is located at the $n^{th}$ pipeline stage 705, where $l<m<n$. It should be noted that the video encoding circuit may have circuit blocks (not shown) other than the bit estimation circuit 704 and the entropy encoding circuit 706, and these circuit blocks may be located at some pipeline stages (not shown) of the multi-stage pipeline architecture. Further, a pipeline register 711 is coupled between the $l^{th}$ pipeline stage 701 and a previous pipeline stage (i.e., $(l-1)^{th}$ pipeline stage), and a pipeline register 712 is coupled between the $l^{th}$ pipeline stage 701 and a next pipeline stage (i.e., $(l+1)^{th}$ pipeline stage). Similarly, a pipeline register 713 is coupled between the $m^{th}$ pipeline stage 703 and a previous pipeline stage (i.e., $(m-1)^{th}$ pipeline stage), and a pipeline register 714 is coupled between the $m^{th}$ pipeline stage 703 and a next pipeline stage (i.e., $(m+1)^{th}$ pipeline stage); and a pipeline register 715 is coupled between the $n^{th}$ pipeline stage 705 and a previous pipeline stage (i.e., $(n-1)^{th}$ pipeline stage), and a pipeline register 716 is coupled between the $n^{th}$ pipeline stage 705 and a next pipeline stage (i.e., $(n+1)^{th}$ pipeline stage).

Coding units of the video frame IMG may be processed in a pipeline fashion. That is, one coding unit is sequentially processed by different pipeline stages, and the different pipeline stages may process different coding units at the same time. Further, coding units of a video frame may be encoded in a raster scan order. Hence, the coding units in the same video frame are fed into the multi-stage pipeline architecture in a raster scan order. That is, coding units in the same coding unit row are processed from the left-most coding unit to the right-most coding unit, and coding unit rows in the same video frame are processed from the uppermost coding row to the lowermost coding row. For example, coding units $CU_i$ belonging to the same slice are sequentially fed into the multi-stage pipeline architecture, where i is the coding unit index in a slice, and the slice starts with $CU_0$ (i.e., $CU_i$ with i=0).

Figure 8:
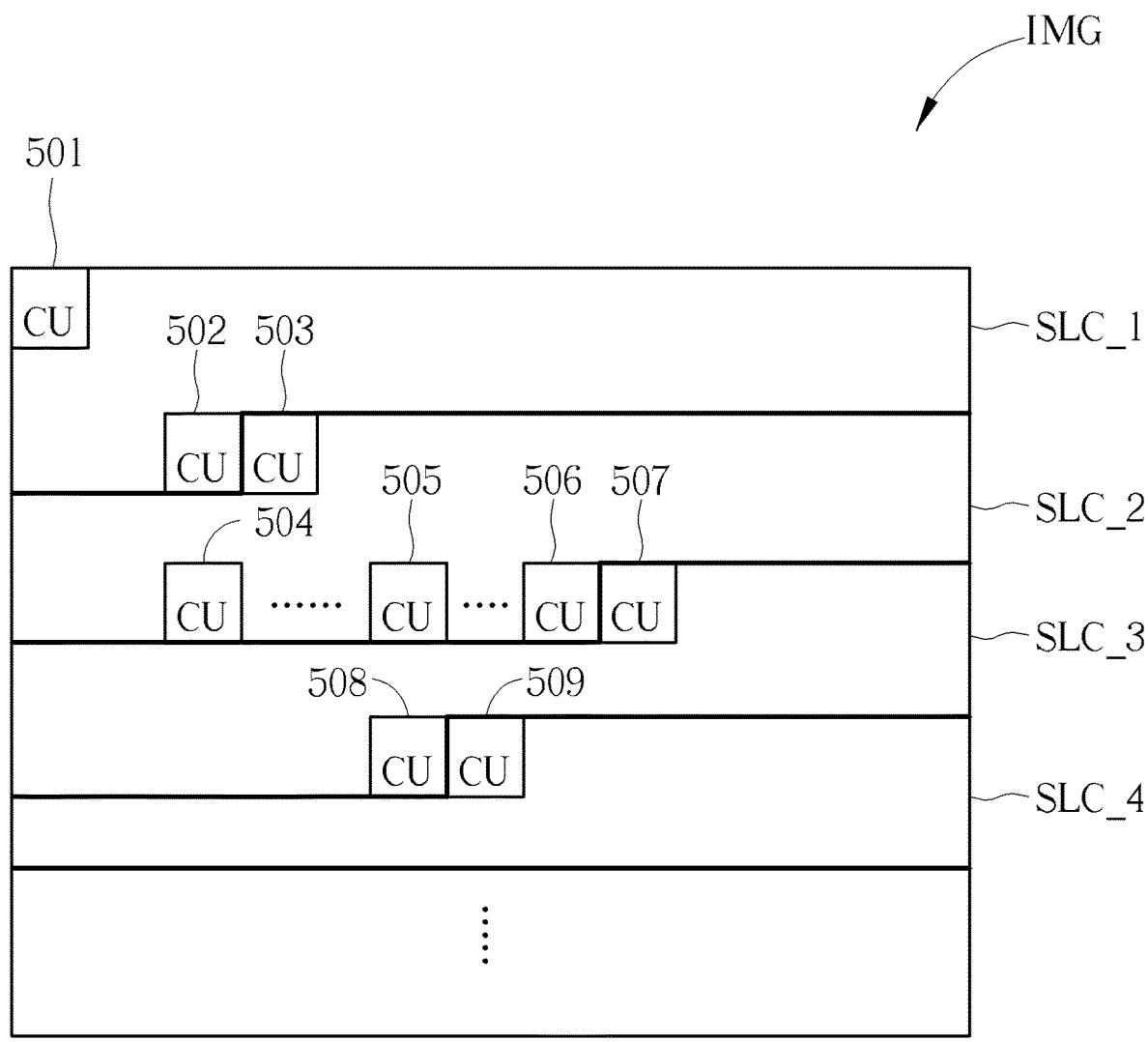
FIG. 8 is a diagram illustrating another arrangement of coding units belonging to different slices encoded using a fixed-size slice encoding scheme according to an embodiment of the present invention.

Please refer to FIG. 7 in conjunction with FIG. 8. FIG. 8 is a diagram illustrating another arrangement of coding units belonging to different slices encoded using a fixed-size slice encoding scheme according to an embodiment of the present invention. Since bitstream sizes of bitstreams of different slices in the same video frame IMG (i.e., encoded sizes of different slices in the same video frame IMG) are required to be constrained by respective predetermined bitstream size thresholds $SliceSize_{Max}$ that may be identical to or different from each other, the coding unit boundary between adjacent slices (e.g., boundary between an end of a current slice and a start of a next slice) should be determined by the slice decision circuit 702 beforehand to avoid the condition in which the encoded slice size exceeds the maximum encoded slice size after encoding the current coding unit that is the last coding unit of the current slice. As shown in FIG. 8, the slice decision circuit 702 is operative to determine that the coding unit 502 is the last coding unit of the slice SLC_1, the coding unit 506 is the last coding unit of the slice SLC_2, and the coding unit 508 is the last coding unit of the slice SLC_3. Since the coding unit 502 is the last coding unit of the slice SLC_1, the next coding unit (i.e., coding unit 503) is identified as the first coding unit of the next slice (i.e., $CU_0$ of slice SLC_2). Since the coding unit 506 is the last coding unit of the slice SLC_2, the next coding unit (i.e., coding unit 507) is identified as the first coding unit of the next slice (i.e., $CU_0$ of slice SLC_3). Since the coding unit 508 is the last coding unit of the slice SLC_3, the next coding unit (i.e., coding unit 509) is identified as the first coding unit of the next slice (i.e., $CU_0$ of slice SLC_4).

The slice SLC_1 starts with the coding unit 501 and ends with the coding unit 502. The slice SLC_2 starts with the coding unit 503 and ends with the coding unit 506. The slice SLC_3 starts with the coding unit 507 and ends with the coding unit 508. It should be noted that the different slices (e.g., SLC_1-SLC_4) in the same video frame may have different numbers of coding units (i.e., different unencoded slice sizes), but would have the same bitstream size (i.e., the same encoded slice size) under fixed-size slice encoding, if the same predetermined bitstream size threshold Slice $Size_{Max}$ is employed by encoding of different slices.

As mentioned above, coding units in the same video frame are fed into the multi-stage pipeline architecture in a raster scan order. When a current coding unit enters the $1^{th}$ pipeline stage 701 at which the slice decision circuit 702 is located, the slice decision circuit 702 is operative to determine if the current coding unit is the last coding unit of a current slice. Suppose that the coding unit boundary between an end of the slice SLC_1 and a start of the slice SLC_2 has been identified by the slice decision circuit 702, the coding unit 506 is the $N^{th}$ coding unit $CU_N$ (i.e., $CU_i$ with i=N) in the slice SLC_2, the coding unit 505 is the $(N+l-m)^{th}$ coding unit $CU_{N+l-m}$ (i.e., $CU_i$ with i=N+l-m) in the slice SLC_2, and the coding unit 504 is the $(N+l-n)^{th}$ coding unit $CU_{N+l-n}$ (i.e., $CU_i$ with i=N+l-n) in the slice SLC_2. When the coding unit 506 is a current coding unit that enters the $1^{th}$ pipeline stage 701, one previous coding unit that has been processed by the $1^{th}$ pipeline stage 701 and the $m^{th}$ pipeline stage 703 and now enters the $n^{th}$ pipeline stage 705 (n>m>l) is the coding unit 504, and another previous coding unit that has been processed by the $1^{th}$ pipeline stage 701 and now enters the $m^{th}$ pipeline stage 703 (m>l) is the coding unit 505.

The bit estimation circuit 704 is arranged to calculate an estimated bit count of a bitstream of a coding unit before the bitstream of the coding unit is generated by the entropy encoding circuit 706. For example, the video encoding circuit of the pipeline-based video encoder 700 is implemented using the video encoding circuit 300 shown in FIG. 3, where the entropy encoding circuit 305 acts as the entropy encoding circuit 706. In some embodiments of the present invention, the mode decision circuit 315 may act as the bit estimation circuit 704. The mode decision circuit 315 may perform rate-distortion optimization (RDO) to select a best coding mode with a lowest rate-distortion cost from candidate intra prediction modes and candidate inter prediction modes. For example, a rate-distortion cost function J=D+ λ×R is used by the mode decision circuit 315, where J is the rate-distortion cost, D is the pixel distortion after intra/inter prediction is applied to a coding unit, R represents the estimated number of bits needed for representing an encoding result of the coding unit (i.e., an estimated encoded size of the coding unit), and λ stands for the Lagrange multiplier. Hence, after a coding unit undergoes rate-distortion optimization, the value of R may be used as the estimated bit count provided to the slice decision circuit 702 for slice boundary prediction.

Due to inherent characteristics of the multi-stage pipeline architecture, all of the coding units $CU_i$ with 0≤i≤N+l-n are processed by the entropy encoding circuit 706 sequentially, and all of the coding units $CU_i$ with N+l-n+1≤i≤N+l-m are processed by the bit estimation circuit 704 sequentially. After a bitstream of the coding unit 504 (i.e., $CU_{N+l-n}$ in the slice SLC_2) is generated by the entropy encoding circuit 706, actual bit counts of bitstreams of all of the coding units $CU_i$ with 0≤i≤N+l-n determined by the entropy encoding circuit 706 are available to the slice decision circuit 702. In this embodiment, the slice decision circuit 702 can fetch and store an actual bit count of a bitstream of a coding unit each time the bitstream of the coding unit is generated by the entropy encoding circuit 706. Furthermore, after the coding unit 505 (i.e., $CU_{N+l-m}$ in the slice SLC_2) is processed by the bit estimation circuit 704, estimated bit counts of bitstreams of all of the coding units $CU_i$ with N+l-n+1≤i≤N+ l-m determined by the bit estimation circuit 704 are available to the slice decision circuit 702. In this embodiment, the slice decision circuit 702 can fetch and store an estimated bit count of a bitstream of a coding unit each time the bit estimation circuit 704 completes RDO of the coding unit for selecting a best coding mode of the coding unit.

At this moment, all of the coding units $CU_i$ with N+l-m+1≤i≤N are not yet processed by any of the bit estimation circuit 704 and the entropy encoding circuit 706 due to the inherent characteristics of the multi-stage pipeline architecture. Hence, neither actual bit counts of bitstreams of all of the coding units $CU_i$ with N+l-m+1≤i≤N nor estimated bit counts of bitstreams of all of the coding units $CU_i$ with N+l-m+1≤i≤N are available to the slice decision circuit 702. Further, all of the coding units $CU_i$ with N+l-n+1≤i≤N+l-m are not yet processed by the entropy encoding circuit 706 due to the inherent characteristics of the multi-stage pipeline architecture. Hence, actual bit counts of bitstreams of all of the coding units $CU_i$ with N+l-n+1≤i≤N+l-m are not available to the slice decision circuit 702. However, with the help of the bit estimation circuit 704 located at the $m^{th}$ pipeline stage 703 between the $1^{th}$ pipeline stage 701 and the $n^{th}$ pipeline stage 705, estimated bit counts of bitstreams of all of the coding units $CU_i$ with N+l-n+1≤i≤N+l-m are available to the slice decision circuit 702. To put it simply, an estimated bit count calculated by the bit estimation circuit 704 for each coding unit $CU_i$ (N+l-n+1≤i≤N+l-m) and an actual bit count determined by the entropy encoding circuit 706 for each coding unit $CU_i$ (0≤i≤N+l-n) can be used in slice boundary prediction (i.e., slice end prediction/slice start prediction) performed at the slice decision circuit 702. Regarding all of the coding units $CU_i$ with N+l-m+1≤i≤N, the present invention proposes using a parameter $CUBit_{emp}$ in slice boundary prediction (i.e., slice end prediction/slice start prediction) performed at the slice decision circuit 102, where the parameter $CUBit_{emp}$ is representative of a predicted bit count of all coding units $CU_i$ (N+l-m+1≤i≤N) that do not undergo rate-distortion optimization and entropy encoding involved in encoding of the coding units $CU_i$ (N+l-m+1≤i≤N) yet.

In a first exemplary parameter setting design, the parameter $CUBit_{emp}$ used by the slice decision circuit 702 may be derived from a preset empirical constant value.

In a second exemplary parameter setting design, the parameter $CUBit_{emp}$ used by the slice decision circuit 702 may be derived from information fetched from the video encoder. For example, the information fetched from the video encoder may include actual bit counts of bitstreams of previous processed coding units that are determined by the entropy encoding circuit 704. Hence, the parameter $CUBit_{emp}$ may be set on the basis of a maximum bit count or an average bit count that is derived from the information fetched from the video encoder.

In a third exemplary parameter setting design, the parameter $CUBit_{emp}$ used by the slice decision circuit 702 may be derived from the setting of the video encoder. For example, the quantization circuit 304 shown in FIG. 3 performs quantization upon transform coefficients according to a quantization parameter (QP) setting, and the inverse quantization circuit 306 performs inverse quantization upon the quantized transform coefficients according to the same QP setting used by the quantization circuit 304. When the video encoding circuit of the pipeline-based video encoder 700 is implemented using the video encoding circuit 300, the setting of the video encoder may include the QP setting. Hence, the setting of the parameter $CUBit_{emp}$ depends on the QP setting.

In a fourth exemplary parameter setting design, the parameter $CUBit_{emp}$ used by the slice decision circuit 702 may be derived from the setting of the slice decision circuit 702. For example, a threshold value $SLC_{Thr}$ is used by the slice decision circuit 702 to judge if the current coding unit is the last coding unit of the current slice. Hence, the setting of the parameter $CUBit_{emp}$ depends on the threshold value $SLC_{Thr}$.

In a fifth exemplary parameter setting design, the parameter $CUBit_{emp}$ used by the slice decision circuit 702 may be derived from a capacity of a network (e.g., network 114 shown in FIG. 1) through which bitstreams generated by the entropy encoding circuit 704 are transmitted.

In a sixth exemplary parameter setting design, the parameter $CUBit_{emp}$ used by the slice decision circuit 702 may be derived from availability of macroblock-adaptive frame-field (MBAFF) coding. The MBAFF coding makes it possible to adaptively switch between frame and field coding within a single frame, for example, to maximize the coding efficiency. Since macroblocks are handled in pairs consisting of two vertically adjacent macroblocks under MBAFF coding, a coding unit boundary between an end of a current slice and a start of a next slice should be a vertical boundary between two macroblock pairs each consisting of two vertically adjacent macroblocks, as illustrated in FIG. 10. Hence, the parameter $CUBit_{emp}$ should be properly set to ensure correctness of the slice boundary prediction (i.e., slice end prediction/slice start prediction) under fixed-length slice encoding.

It should be noted that the above parameter setting designs are for illustrative purposes only, and are not meant to be limitations of the present invention. In practice, setting of the parameter $CUBit_{emp}$ used by the slice decision circuit 702 may vary, depending upon actual design considerations.

When the coding unit 506 (i.e., $CU_N$ in the slice SLC_2) is a current coding unit that enters the $l^{th}$ pipeline stage 701 at which the slice decision circuit 702 is located, the slice decision circuit 702 calculates a bit-sum $BitSum_N$ of a slice to determine if the coding unit 506 (i.e., $CU_N$ in the slice SLC_2) is the last coding unit of the slice SLC_2 under fixed-size slice encoding. For example, the computation of the bit-sum $BitSum_N$ may be expressed using the following formula.

$$BitSum_N = \sum_{i=0}^{i=N+l-n} CUBit_i + \sum_{i=N+l-n+1}^{N+l-m} ESTCUBit_i + SLC_{hdr} + CUBit_{emp} \quad (2)$$

In above formula (2), i is the coding unit index in a slice, $CUBit_i$ is an actual bit count of a bitstream of a coding unit $CU_i$ determined by the entropy encoding circuit 704, $ESTCUBit_i$ is an estimated bit count of a bitstream of a coding unit $CU_i$ calculated by the bit estimation circuit 704, $SLC_{hdr}$ is a predetermined bit count of a slice header, and $CUBit_{emp}$ is a parameter representative of a predicted bit count of at least one coding unit in the pipeline that does not undergo rate-distortion optimization and entropy encoding yet. It should be noted the parameter $CUBit_{emp}$ may have different bit-count values in above formula (1) and formula (2).

After the estimated bit-sum $BitSum_N$ of the slice SLC_2 is obtained using above formula (2), the slice decision circuit 702 compares the estimated bit-sum $BitSum_N$ with the threshold value $SLC_{Thr}$ to generate a comparison result, and refers to the comparison result to determine if the coding unit 506 (i.e., $CU_N$ in the slice SLC_2) is the last coding unit of the slice SLC_2 under fixed-size slice encoding. If the estimated bit-sum $BitSum_N$ exceeds the threshold value $SLC_{Thr}$, the slice decision circuit 702 determines that the coding unit 506 (i.e., $CU_N$ in the slice SLC_2) is the last coding unit of the slice SLC_2 under fixed-size slice encoding, and indicates end-of-slice to the video encoding circuit. In some embodiments of the present invention, an end-of-slice syntax is signaled in the bitstream of the slice SLC_2 generated from the entropy encoding circuit 704. If the estimated bit-sum $BitSum_N$ does not exceed the threshold value $SLC_{Thr}$ yet, the slice decision circuit 702 determines that the coding unit 506 (i.e., $CU_N$ in the slice SLC_2) is not the last coding unit of the slice SLC_2 under fixed-size slice encoding.

It should be noted that the setting of the threshold value $SLC_{Thr}$ may be adjusted, depending on the setting of the parameter $CUBit_{emp}$ which is a predicted bit count of coding unit(s) in the pipeline. For example, the threshold value $SLC_{Thr}$ may be smaller than or equal to the predetermined bitstream size threshold $SliceSize_{Max}$. Further, the same formula (2) can be used to identify last coding units of other slices (e.g., coding unit 502 of slice SLC_1 and coding unit 508 of slice SLC_3) under fixed-size slice encoding.

Figure 9:
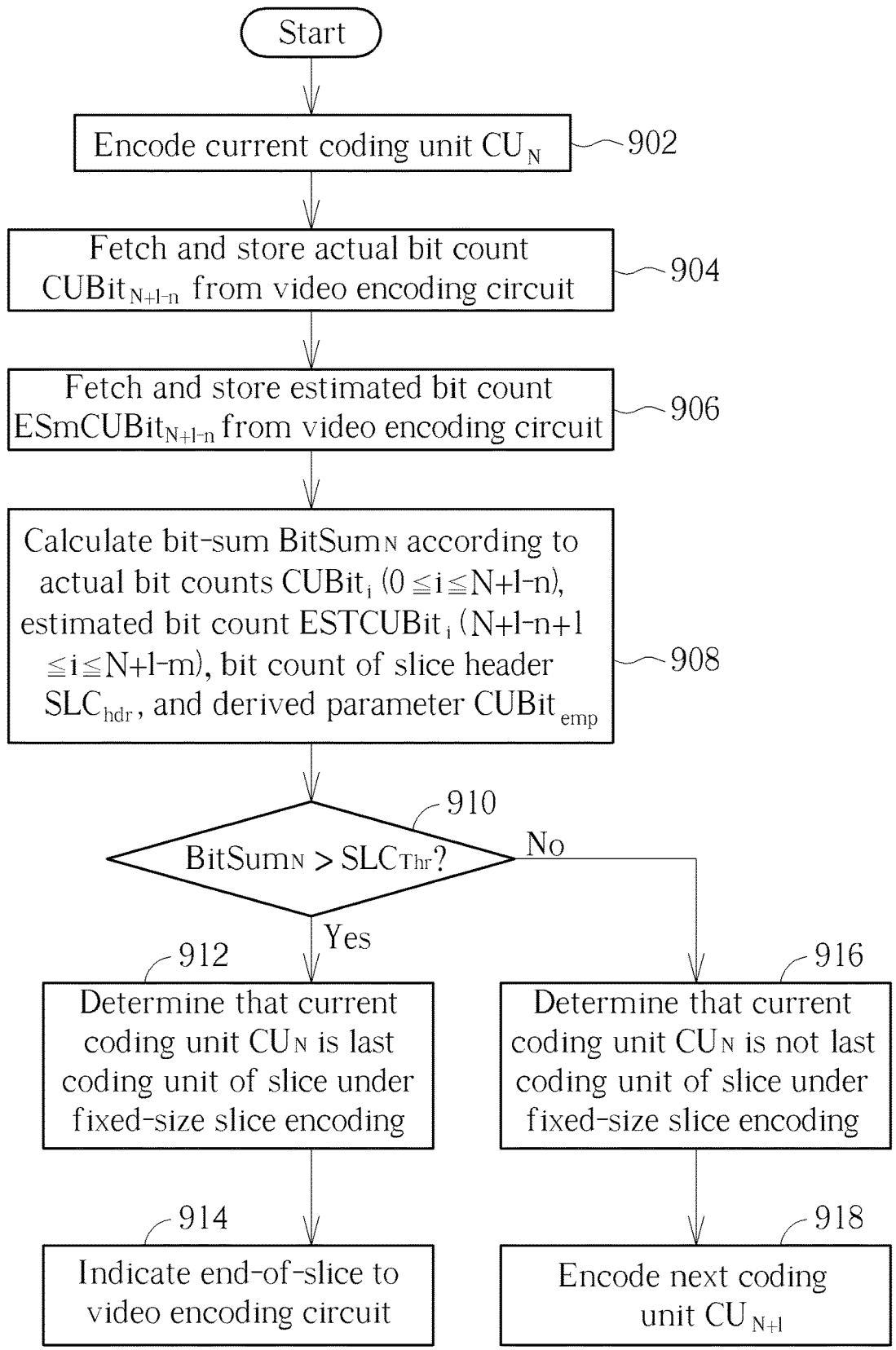
FIG. 9 is a flowchart illustrating a second slice boundary prediction method for determining a start/end of a slice processed under fixed-size slice encoding according to an embodiment of the present invention.

FIG. 9 is a flowchart illustrating a second slice boundary prediction method for determining a start/end of a slice processed under fixed-size slice encoding according to an embodiment of the present invention. Provided that the result is substantially the same, the steps are not required to be executed in the exact order shown in FIG. 9. The slice boundary prediction method may include following steps.

Step 902: The $l^{th}$ pipeline stage 701 performs processing of the current coding unit $CU_N$ in a current slice, wherein the slice decision circuit 702 is located at the $l^{th}$ pipeline stage 701.

Step 904: The slice decision circuit 702 fetches and stores an actual bit count $CUBit_{N+l-n}$ of a bitstream of the coding unit $CU_{N+l-n}$ from the video encoding circuit (particularly, the $n^{th}$ pipeline stage 705 at which the entropy encoding circuit 706 is located).

Step 906: The slice decision circuit 702 fetches and stores an estimated bit count $ESmCUBit_{N+l-n}$ of a bitstream of the coding unit $CU_{N+l-m}$ from the video encoding circuit (particularly, the $m^{th}$ pipeline stage 703 at which the bit estimation circuit 704 is located).

Step 908: The slice decision circuit 702 calculates a bit-sum $BitSum_N$ of the current slice according to actual bit counts $CUBit_i$ ($0 \leq i \leq N+l-n$), estimated bit counts $ESTCUBit_i$ ($N+l-n+1 \leq i \leq N+l-m$), a bit count of a slice header $SLC_{hdr}$, and a derived parameter $CUBit_{emp}$.

Step 910: The slice decision circuit 702 checks if the estimated bit-sum $BitSum_N$ exceeds the threshold value $SLC_{Thr}$.

Step 912: The slice decision circuit 702 predicts a coding unit boundary between the current slice and a next slice by determining that the current coding unit $CU_N$ is the last coding unit of the current slice under fixed-size slice encoding.

Step 914: The slice decision circuit 702 indicates end-of-slice to the video encoding circuit.

Step 916: The slice decision circuit 702 determines that the current coding unit $CU_N$ is not the last coding unit of the current slice under fixed-size slice encoding.

Step 918: The $l^{th}$ pipeline stage 701 proceeds with processing of the next coding unit $CU_{N+1}$ in the current slice.

Since a person skilled in the pertinent art can readily understand details of the slice boundary prediction method shown in FIG. 9 after reading above paragraphs directed to the pipeline-based video encoder 700 shown in FIG. 7, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video encoder comprising:
a video encoding circuit, arranged to encode a first slice in a frame according to a first coding unit boundary between an end of the first slice and a start of a second slice in the frame, and output a first bitstream of the first slice, wherein each slice in the frame comprises a plurality of coding units, and each coding unit comprises a plurality of pixels; and
a slice decision circuit, arranged to predict the first coding unit boundary before a bitstream of a last coding unit of the first slice is generated by the video encoding circuit, and inform the video encoding circuit of the first coding unit boundary, wherein the video encoding circuit refers to the first coding unit boundary predicted by the slice decision circuit to ensure that a bitstream size of the first bitstream is constrained by a predetermined bitstream size threshold;
wherein the video encoding circuit and the slice decision circuit are configured in multi-stage pipeline architecture with a plurality of pipeline stages; the video encoding circuit comprises an entropy encoding circuit located at an $n^{th}$ pipeline stage among the pipeline stages; the slice decision circuit is located at an $l^{th}$ pipeline stage among the pipeline stages, where $l<n$; when an $N^{th}$ coding unit belonging to the first slice enters the $l^{th}$ pipeline stage, the slice decision circuit refers to actual bit counts of bitstreams of $i^{th}$ coding units determined by the entropy encoding circuit for determining if the $N^{th}$ coding unit is a last coding unit of the first slice, where i is a coding unit index in the first slice, and $0 \leq i \leq N+l-n$.

2. The video encoder of claim 1, wherein none of coding units in the first slice is re-encoded by the video encoding circuit for making the bitstream size of the first bitstream constrained by the predetermined bitstream size threshold.

3. The video encoder of claim 1, wherein the video encoding circuit is further arranged to encode the second slice according to a second coding unit boundary between an end of the second slice and a start of a third slice in the frame, and output a second bitstream of the second slice; and the slice decision circuit is further arranged to predict the second coding unit boundary before a bitstream of a last coding unit of the second slice is generated by the video encoding circuit, and inform the video encoding circuit of the second coding unit boundary, wherein the video encoding circuit refers to the second coding unit boundary predicted by the slice decision circuit to ensure that a bitstream size of the second bitstream is constrained by a predetermined bitstream size threshold.

4. The video encoder of claim 1, wherein the slice decision circuit predicts the first coding unit boundary according to at least a bit count of a slice header of the first slice.

5. The video encoder of claim 1, wherein the slice decision circuit predicts the first coding unit boundary according to at least a parameter representative of a predicted bit count of at least one coding unit in a pipeline that does not undergo rate-distortion optimization (RDO) or entropy encoding involved in encoding said at least one coding unit yet.

6. The video encoder of claim 1, wherein the video encoding circuit further comprises a bit estimation circuit located at an $m^{th}$ pipeline stage among the pipeline stages, where $l<m<n$; and when the $N^{th}$ coding unit belonging to the first slice enters the $l^{th}$ pipeline stage, the slice decision circuit further refers to estimated bit counts of bitstreams of $j^{th}$ coding units calculated by the bit estimation circuit for determining if the $N^{th}$ coding unit is the last coding unit of the first slice, where j is a coding unit index in the first slice, and $N+l-n+1 \leq j \leq N+l-m$.

7. A video encoding method comprising:
encoding, by a video encoding circuit, a first slice in a frame according to a first coding unit boundary between an end of the first slice and a start of a second slice in the frame, and outputting a first bitstream of the first slice, wherein each slice in the frame comprises a plurality of coding units, and each coding unit comprises a plurality of pixels; and
predicting the first coding unit boundary before a bitstream of a last coding unit of the first slice is generated by the video encoding circuit, and informing the video encoding circuit of the first coding unit boundary, wherein the video encoding circuit refers to the predicted first coding unit boundary to ensure that a bitstream size of the first bitstream is constrained by a predetermined bitstream size threshold;
wherein the step of encoding the first slice and the step of predicting the first coding unit boundary are performed in a pipeline encoding process having a plurality of pipeline stages; the step of encoding the first slice comprises entropy encoding located at an $n^{th}$ pipeline stage among the pipeline stages; the step of predicting the first coding unit boundary is located at an $l^{th}$ pipeline stage among the pipeline stages, where $l<n$; when an $N^{th}$ coding unit belonging to the first slice enters the $l^{th}$ pipeline stage, the step of predicting the first coding unit boundary refers to actual bit counts of bitstreams of $i^{th}$ coding units determined by the entropy encoding for determining if the $N^{th}$ coding unit is a last coding unit of the first slice, where, where i is a coding unit index in the first slice, and $0 \leq i \leq N+l-n$.

8. The video encoding method of claim 7, wherein none of coding units in the first slice is re-encoded by the video encoding circuit for making the bitstream size of the first bitstream constrained by the predetermined bitstream size threshold.

9. The video encoding method of claim 7, further comprising:
encoding, by the video encoding circuit, the second slice according to a second coding unit boundary between an end of the second slice and a start of a third slice in the frame, and outputting a second bitstream of the second slice; and
predicting the second coding unit boundary before a bitstream of a last coding unit of the second slice is generated by the video encoding circuit, and informing the video encoding circuit of the second coding unit boundary, wherein the video encoding circuit refers to the predicted second coding unit boundary to ensure that a bitstream size of the second bitstream is constrained by a predetermined bitstream size threshold.

10. The video encoding method of claim 7, wherein the first coding unit boundary is predicted according to at least a bit count of a slice header of the first slice.

11. The video encoding method of claim 7, wherein the first coding unit boundary is predicted according to at least a parameter representative of a predicted bit count of at least one coding unit in a pipeline that does not undergo rate-distortion optimization (RDO) or entropy encoding involved in encoding said at least one coding unit yet.

12. The video encoding method of claim 7, wherein the step of encoding the first slice further comprises bit estimation located at an $m^{th}$ pipeline stage among the pipeline stages, where $1<m<n$; and when the $N^{th}$ coding unit belonging to the first slice enters the $l^{th}$ pipeline stage, the step of predicting the first coding unit boundary further refers to estimated bit counts of bitstreams of $j^{th}$ coding units calculated by the bit estimation for determining if the $N^{th}$ coding unit is the last coding unit of the first slice, where j is a coding unit index in the first slice, and $N+l-n+1 \leq j \leq N+l-m$.

* * * * *